(12) United States Patent
Iwamatsu

(10) Patent No.: US 11,195,025 B2
(45) Date of Patent: Dec. 7, 2021

(54) INFORMATION PROCESSING DEVICE, INFORMATION PROCESSING METHOD, AND STORAGE MEDIUM FOR TEMPORALLY DIVIDING TIME-SERIES DATA FOR ANALYSIS

(71) Applicant: NEC CORPORATION, Tokyo (JP)

(72) Inventor: Yosuke Iwamatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/766,974

(22) PCT Filed: Nov. 22, 2018

(86) PCT No.: PCT/JP2018/043134
§ 371 (c)(1),
(2) Date: May 26, 2020

(87) PCT Pub. No.: WO2019/103087
PCT Pub. Date: May 31, 2019

(65) Prior Publication Data
US 2020/0320310 A1 Oct. 8, 2020

(30) Foreign Application Priority Data
Nov. 27, 2017 (JP) .............................. JP2017-226574

(51) Int. Cl.
*G06K 9/00* (2006.01)
*G06F 16/2458* (2019.01)
(Continued)

(52) U.S. Cl.
CPC ..... *G06K 9/00771* (2013.01); *G06F 16/2474* (2019.01); *G06K 9/00765* (2013.01); *G06K 9/03* (2013.01); *G06K 9/6227* (2013.01)

(58) Field of Classification Search
CPC .. G06K 9/00771; G06K 9/00765; G06K 9/03; G06K 9/6227; G06F 16/2474
See application file for complete search history.

(56) References Cited

U.S. PATENT DOCUMENTS 8,811,661 B2   8/2014   Hattori
2010/0303296 A1   12/2010   Hattori
(Continued)

FOREIGN PATENT DOCUMENTS

JP   2006-252394 A   9/2006
JP   2010-279004 A   12/2010
(Continued)

OTHER PUBLICATIONS

WO2012/140834 Machine Translation.*
(Continued)

*Primary Examiner* — Casey L Kretzer
(74) *Attorney, Agent, or Firm* — Sughrue Mion, PLLC

(57) ABSTRACT

An information processing device including: an input unit that receives time-series data including a plurality of data input in time series and having a correlation in at least a part between the data; and a division unit that temporally divides the time-series data by a first divider width to cause an analysis system to perform a first analysis process of the time-series data with the first divider width and temporally divides the time-series data by a second divider width that is longer than the first divider width to cause the analysis system to perform a second analysis process of the time-series data with the second divider width.

9 Claims, 16 Drawing Sheets

(51) Int. Cl.
  *G06K 9/03*   (2006.01)
  *G06K 9/62*   (2006.01)

(56) References Cited

U.S. PATENT DOCUMENTS

2013/0238619 A1    9/2013  Hanaoka et al.
2018/0336931 A1*  11/2018  Tandon ................ G11B 27/031

FOREIGN PATENT DOCUMENTS

| JP | 2012-117987 A | 6/2012 |
| JP | 2014-123303 A | 7/2014 |
| JP | 2014-228924 A | 12/2014 |
| JP | 2015-049655 A | 3/2015 |
| JP | 2017-135656 A | 8/2017 |
| WO | 2012/140834 A1 | 10/2012 |

OTHER PUBLICATIONS

International Search Report for PCT/JP2018/043134 dated Feb. 12, 2019 [PCT/ISA/210].
Written Opinion for PCT/JP2018/043134 dated Feb. 12, 2019 [PCT/ISA/237].

* cited by examiner

FIG. 11

| NUMBER OF SUBJECTS | SINGLE MODE | MULTIPLEX MODE |
|---|---|---|
| 2 | ANALYSIS ACCURACY a = 0.35 | ANALYSIS ACCURACY a = 0.75 |
| 8 | ANALYSIS ACCURACY a = 0.90 | ANALYSIS ACCURACY a = 0.95 |

FIG. 14

| NUMBER OF SUBJECTS | SINGLE MODE | MULTIPLEX MODE |
|---|---|---|
| 2 | ANALYSIS LOAD = 0.5<br>TOTAL ANALYSIS LOAD IN ANALYSIS CLUSTER = 8.0 + 0.5 = 8.5<br>ANALYSIS ACCURACY b = 1.0 | ANALYSIS LOAD = 0.5 + 0.5 = 1.0<br>TOTAL ANALYSIS LOAD IN ANALYSIS CLUSTER = 8.0 + 1.0 = 9.0<br>ANALYSIS ACCURACY b = 1.0 |
| 8 | ANALYSIS LOAD = 2.0<br>TOTAL ANALYSIS LOAD IN ANALYSIS CLUSTER = 8.0 + 2.0 = 10.0<br>ANALYSIS ACCURACY b = 1.0 | ANALYSIS LOAD = 2.0 + 2.0 = 4.0<br>TOTAL ANALYSIS LOAD IN ANALYSIS CLUSTER = 8.0 + 4.0 = 12.0<br>ANALYSIS ACCURACY b = 0.8 |

FIG. 15

| NUMBER OF SUBJECTS | SINGLE MODE | MULTIPLEX MODE |
|---|---|---|
| 2 | ANALYSIS ACCURACY a = 0.35<br>ANALYSIS ACCURACY b = 1.0<br>AGGREGATED VALUE a * b = 0.35 * 1.0 = 0.35 | ANALYSIS ACCURACY a = 0.75<br>ANALYSIS ACCURACY b = 1.0<br>AGGREGATED VALUE a * b = 0.75 * 1.0 = 0.75 |
| 8 | ANALYSIS ACCURACY a = 0.90<br>ANALYSIS ACCURACY b = 1.0<br>AGGREGATED VALUE a * b = 0.90 * 1.0 = 0.90 | ANALYSIS ACCURACY a = 0.95<br>ANALYSIS ACCURACY b = 0.8<br>AGGREGATED VALUE a * b = 0.95 * 0.8 = 0.76 |

INFORMATION PROCESSING DEVICE, INFORMATION PROCESSING METHOD, AND STORAGE MEDIUM FOR TEMPORALLY DIVIDING TIME-SERIES DATA FOR ANALYSIS

CROSS REFERENCE TO RELATED APPLICATIONS

This application is a National Stage of International Application No. PCT/JP2018/043134 filed Nov. 22, 2018, claiming priority based on Japanese Patent Application No. 2017-226574 filed Nov. 27, 2017.

TECHNICAL FIELD

The present invention relates to an information processing device, an information processing method, and a storage medium.

BACKGROUND ART

The Patent Literature 1 discloses an information processing device that performs a fast analysis process for time-series data of the content having a causal relationship along time. The device divides time-series data with the divided time-series data partially overlapped with each other so that the contents having a causal relationship are included in the same partial data and causes a plurality of nodes to process the partial data in parallel. This enables a fast analysis process while maintaining accuracy of the analysis process.

CITATION LIST

Patent Literature

PTL 1: Japanese Patent Application Laid-open No. 2006-252394

SUMMARY OF INVENTION

Technical Problem

In the technology of Patent Literature 1, however, since time-series data is divided so as to partially overlap with each other, each divider width of the time-series data is longer, which may make it difficult to maintain a real-time property of a process. When the overlapped width is small at the time of dividing time-series data for maintaining a real-time property, the accuracy of the analysis process deteriorates.

The present invention has been made in view of the above problem and intends to provide an information processing device, an information processing method, and a storage medium that can perform an accurate analysis process while maintaining a real-time property when time-series data is divided to perform the analysis process.

Solution to Problem

According to one example aspect of the present invention, provided is an information processing device including: an input unit that receives time-series data including a plurality of data input in time series and having a correlation in at least a part between the data; and a division unit that temporally divides the time-series data by a first divider width to cause an analysis system to perform a first analysis process of the time-series data with the first divider width and temporally divides the time-series data by a second divider width that is longer than the first divider width to cause the analysis system to perform a second analysis process of the time-series data with the second divider width.

According to another example aspect of the present invention, provided is an information processing method including: receiving time-series data including a plurality of data input in time series and having a correlation in at least a part between the data; and temporally dividing the time-series data by a first divider width to cause an analysis system to perform a first analysis process of the time-series data with the first divider width and temporally dividing the time-series data by a second divider width that is longer than the first divider width to cause the analysis system to perform a second analysis process of the time-series data with the second divider width.

According to another example aspect of the present invention, provided is a storage medium storing a program that causes a computer to perform: receiving time-series data including a plurality of data input in time series and having a correlation in at least a part between the data; and temporally dividing the time-series data by a first divider width to cause an analysis system to perform a first analysis process of the time-series data with the first divider width and temporally dividing the time-series data by a second divider width that is longer than the first divider width to cause the analysis system to perform a second analysis process of the time-series data with the second divider width.

Advantageous Effects of Invention

According to the present invention, when time-series data is divided to perform an analysis process, an information processing device, an information processing method, and a storage medium that can perform an accurate analysis process while maintaining a real-time property are provided.

BRIEF DESCRIPTION OF DRAWINGS

FIG. 11 is a table illustrating a calculation example of the analysis accuracy corresponding to the number of subjects according to the first example embodiment.

FIG. 14 is a table illustrating a calculation example of an analysis accuracy corresponding to a processing load according to the first example embodiment.

FIG. 15 is a table illustrating a calculation example of an integration value of an analysis accuracy according to the first example embodiment.

DESCRIPTION OF EMBODIMENTS

First Example Embodiment

Figure 1:
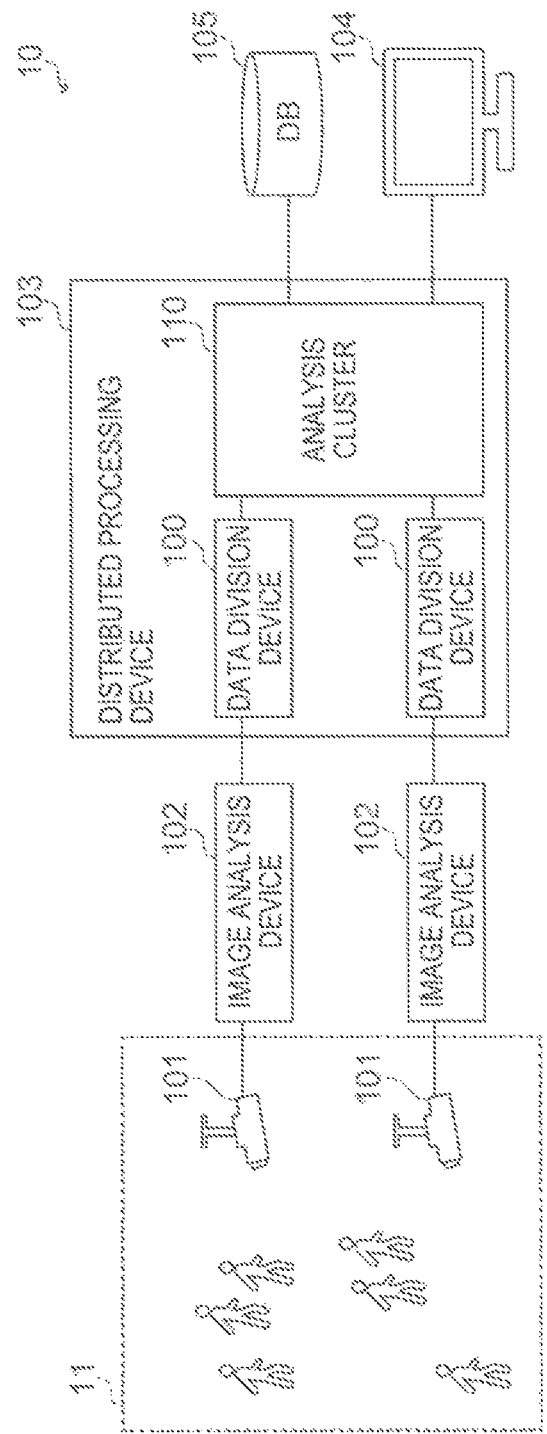
FIG. 1 is a schematic diagram of a surveillance system according to a first example embodiment.

FIG. 1 is a schematic diagram of a surveillance system according to the present example embodiment. A surveillance system 10 is a system for finding a suspicious person in real time, for example, and preventing a crime and has surveillance cameras 101, image analysis devices 102, a distributed processing device 103, a display device 104, and a database (DB) 105. The surveillance camera 101 is installed in a monitoring section 11 in which people comes and goes, such as an airport, a station, a shopping mall, or the like, and performs capturing of image data (moving image data) at a predetermined framerate. The number of surveillance cameras 101 is not limited, and around several hundreds to several thousands of surveillance cameras 101 may be installed within a single monitoring section 11.

The surveillance camera 101 includes an image capture device, an analog-to-digital (A/D) converter circuit, a conversion circuit, and an image processing circuit. The surveillance camera 101 can generate moving image data encoded in a predetermined format by converting an analog image signal obtained from the image capture device into digital RAW data and performing predetermined image processing on the RAW data.

The image analysis device 102 analyzes the content of moving image data from the surveillance camera 101 in real time and outputs data including information obtained by the analysis. For example, the image analysis device 102 can detect a subject (a person, an object, or the like) from moving image data and generate subject information. The subject information is information such as the number of subjects or identification information on each subject and is generated for every frame of moving image data, for example. The data including subject information is continuously generated by the image analysis device 102 and is sequentially input for the distributed processing device 103 in time series. In such a way, a plurality of data including subject information are input to the distributed processing device 103 as time-series data and have a correlation in at least a part between data.

Note that, although the image analysis devices 102 is provided for each surveillance camera 101 in the present example embodiment, the example embodiment is not limited to such a configuration. The image analysis device 102 may be any device that can analyze moving image data obtained from each of the surveillance cameras 101 in real time and input the analysis result to the distributed processing device 103 as time-series data. For example, a single image analysis device 102 may perform analysis on multiple types of moving image data obtained from the plurality of surveillance cameras 101. Alternatively, the image analysis device 102 may be formed integrally with the surveillance camera 101 or the distributed processing device 103.

The distributed processing device 103 includes a data division device 100 and an analysis cluster (analysis system) 110. Time-series data from the image analysis device 102 is temporally divided by the data division device 100, and distributed processing is performed on the divided data in the analysis cluster 110. The analysis cluster 110 includes a plurality of nodes, and each of the nodes may be formed of a computer, a processor, or the like. The analysis cluster 110 may be provided separately from the distributed processing device 103 or may be formed of a plurality of cloud servers or the like arranged over the network.

The analysis cluster 110 performs an analysis process for time-series data temporally divided in the data division device 100. A part of correlation is lost due to time division in time-series data, and the analysis process includes a process of restoring the lost correlation. For example, in the analysis process, a subject which has directly approached a particular subject, a subject which seems to have been located near a particular subject indirectly through another subject, or the like is immediately detected (for example, within several seconds) based on subject information. That is, a correlation between subjects is detected. An analysis result of the analysis process can be used for supporting searching for an owner candidate of a suspicious left article, searching for a person who has contacted a criminal, or the like.

The display device 104 is a personal computer, a surveillance server, or the like and displays an analysis result from the analysis cluster 110. The database 105 is provided in a hard disk, a storage server, or the like and stores the analysis result from the analysis cluster 110. The display device 104 and the database 105 are connected to the distributed processing device 103 directly or via a network.

Figure 2:
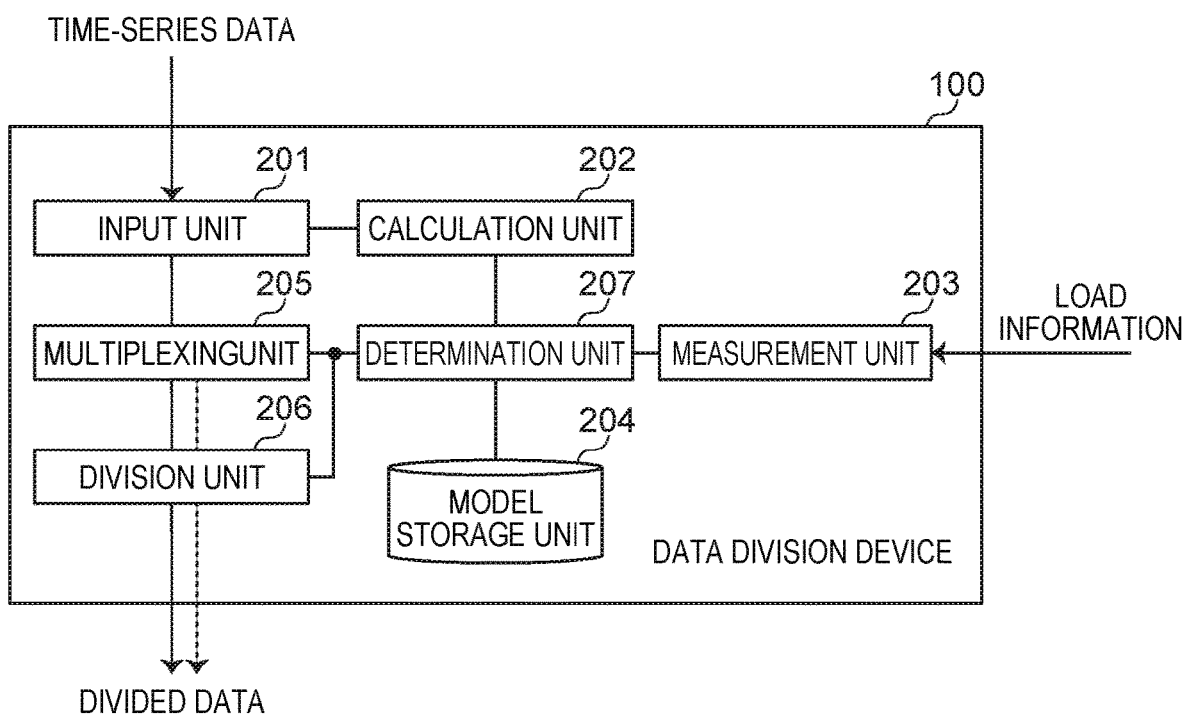
FIG. 2 is a block diagram of a data division device according to the first example embodiment.

FIG. 2 is a block diagram of the data division device 100 according to the present example embodiment. The data division device 100 has an input unit 201, a calculation unit 202, a measurement unit 203, a model storage unit 204, a multiplexing unit 205, a division unit 206, and a determination unit 207. The input unit 201 receives time-series data that is to be a target of an analysis process from the outside of the data division device 100 (the image analysis device 102). The data division device 100 is one example embodiment of the information processing device according to the present invention.

The calculation unit 202 calculates the amount of input data of time-series data received at the input unit 201 within a predetermined period. In the present example embodiment, subject information is input as time-series data, and the number of subjects within a predetermined period is calculated. Herein, the number of subjects may be rephrased as a congestion degree of subjects included in image data.

The measurement unit 203 obtains load information from the analysis cluster 110. In the analysis cluster 110, another process such as an analysis process for another time-series data is performed, and the load information obtained here is information on a processing load caused by the another process. In the model storage unit 204, a subject/accuracy model, a subject/load model, and a load/accuracy model are stored in advance. These models will be described later with reference to FIG. 3A to FIG. 6.

The multiplexing unit 205 multiplexes time-series data received at the input unit 201. For example, the multiplexing unit 205 duplicates time-series data to generate the same time-series data. These two time-series data are input from the multiplexing unit 205 to the division unit 206.

The division unit 206 temporally divides one of the time-series data obtained from the multiplexing unit 205 by a short-time divider width (first divider width) and temporally divides the other time-series data obtained from the multiplexing unit 205 by a long-time divider width (second divider width). The short-time divider width is 1 second, for example, and the long-time divider width is 10 seconds, for example. By dividing time-series data by the short-time divider width to perform an analysis process, it is possible to obtain an analysis result having a high real-time property. Further, by dividing time-series data by the long-time divider width to perform an analysis process, it is possible to obtain an analysis result having high analysis accuracy. The temporally divided time-series data (divided data) is transferred from the division unit 206 to the analysis cluster 110, and a first analysis process with the first divider width and a second analysis process with the second divider width are performed in parallel in the analysis cluster 110.

The determination unit 207 selects an operation mode of either a multiplex mode that performs the first analysis process and the second analysis process or a single mode that stops the second analysis process based on the number of subjects calculated by the calculation unit 202. That is, the determination unit 207 switches the operation mode between the multiplex mode and the single mode. The determination unit 207 uses various models stored in the model storage unit 204 to calculate the analysis accuracy obtained in the multiplex mode and the analysis accuracy obtained in the single mode, respectively, based on the number of subjects and selects the operation mode by which higher analysis accuracy is obtained out of the multiplex mode and the signal mode. Herein, the analysis accuracy represents a restored degree of a lost correlation.

Figure 3A:
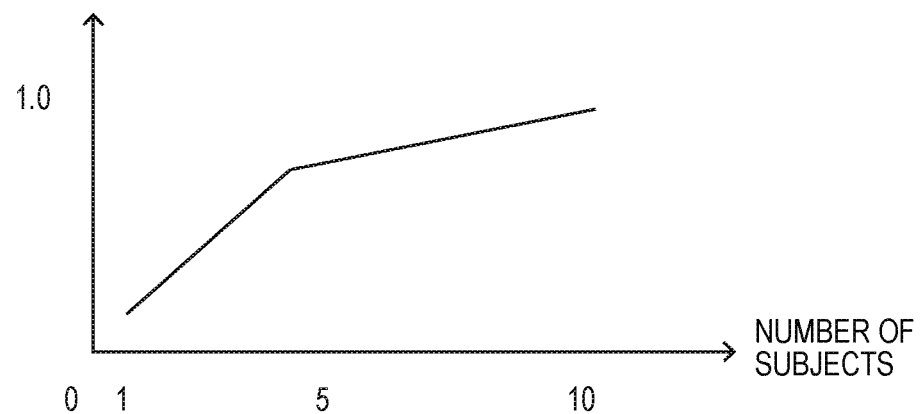
FIG. 3A is one example of a subject/accuracy model according to the first example embodiment.
Figure 3B:
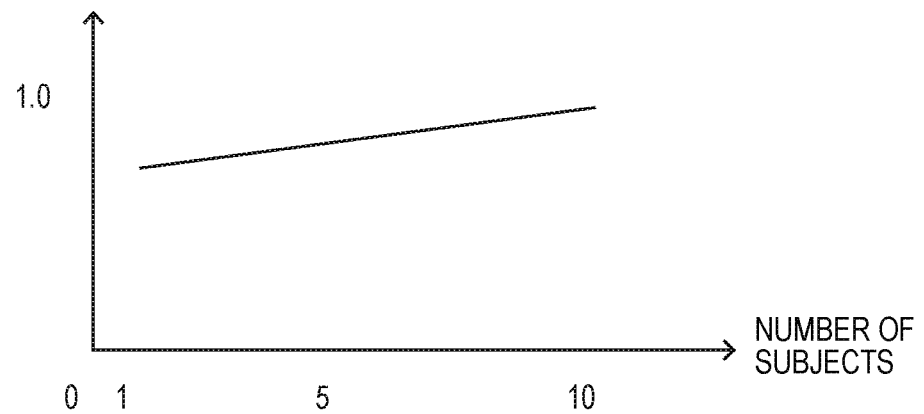
FIG. 3B is one example of a subject/accuracy model according to the first example embodiment.

FIG. 3A and FIG. 3B illustrate one example of a subject/accuracy model according to the present example embodiment. The subject/accuracy model is a modeled prediction value of the analysis accuracy corresponding to the number of subjects and is generated based on historical statistics or the like in advance.

FIG. 3A is a graph illustrating a relationship between the number of subjects and the analysis accuracy in the first analysis process with the short-time divider width. This graph illustrates a model defined by the following Equation (1).

$$\text{Analysis accuracy} = \text{the number of subjects}*0.225-0.1$$
$$[\text{if } 1 \leq \text{the number of subjects} \leq 4],$$

$$\text{the number of subjects}*0.025+0.7[\text{if the number of subjects}>4] \quad \text{Equation (1)}$$

Further, FIG. 3B is a graph illustrating a relationship between the number of subjects and the analysis accuracy in the second analysis process with the long-time divider width. This graph illustrates a model defined by the following Equation (2).

$$\text{Analysis accuracy} = \text{the number of subjects}*0.025+0.7$$
$$[\text{if } 1 \leq \text{the number of subjects}] \quad \text{Equation (2)}$$

The analysis accuracy as illustrated in FIG. 3A and FIG. 3B corresponding to the number of subjects is denoted as an "analysis accuracy a" in particular. The analysis accuracy a has a proportional relationship to the number of subjects and is higher for a larger number of subjects. The subject/accuracy model will be further described with reference to FIG. 4A and FIG. 4B.

Figure 4A:
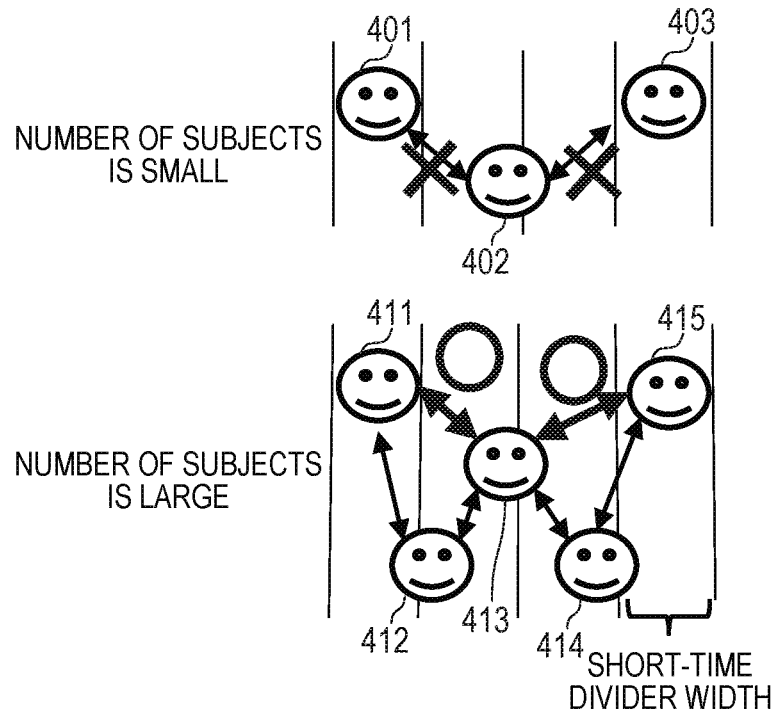
FIG. 4A is a conceptual diagram illustrating a proximity relationship between subjects according to the first example embodiment.
Figure 4B:
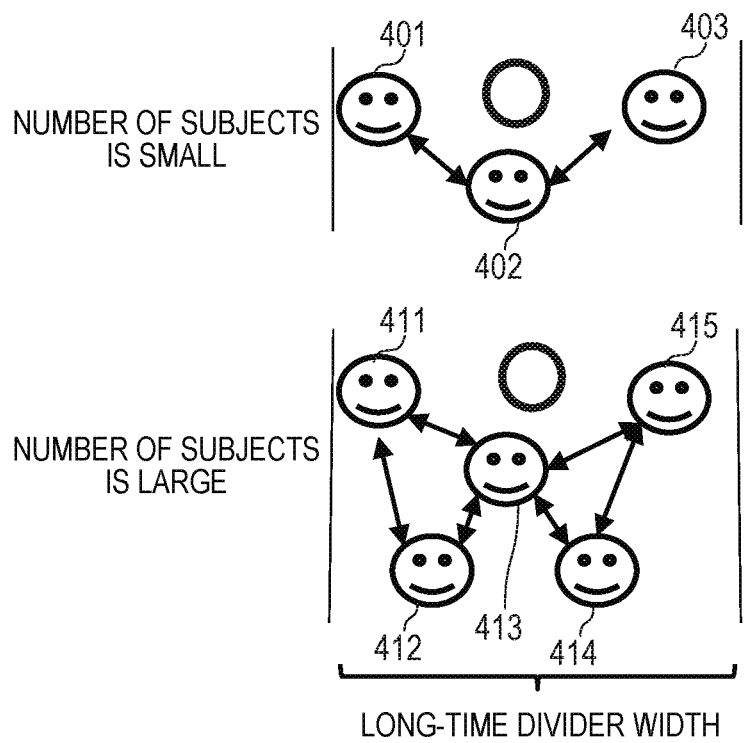
FIG. 4B is a conceptual diagram illustrating a proximity relationship between subjects according to the first example embodiment.

FIG. 4A is a conceptual diagram illustrating a proximity relationship between subjects when time-series data is temporally divided by the short-time divider width. The upper part represents a case where the number of subjects is small, and the lower part represents a case where the number of subjects is large. Further, FIG. 4B is a conceptual diagram illustrating a proximity relationship between subjects when time-series data is temporally divided by the long-time divider width. As with FIG. 4A, the upper part represents a case where the number of subjects is small, and the lower part represents a case where the number of subjects is large.

In FIG. 4A and FIG. 4B, the horizontal axis direction and the vertical axis direction denote time and distance, respectively, and one section partitioned by a vertical line corresponds to one divided data. When the long-time divider width is four times the shot-time divider width, and a predetermined period is equal to the length of the long-time divider width, the number of subjects is three (subjects 401 to 403) when the number of subjects is small (upper part), and the number of subjects is five (subjects 411 to 415) when the number of subjects is large (lower part).

As illustrated in the upper part of FIG. 4A, when the short-time divider width is used and the number of subjects is small, the subject 401 and the subject 402 that are close to each other may often be included in different divided data. In the analysis cluster 110, since each divided data is analyzed and processed independently, the correlation between the subject 401 and the subject 402, that is, the arrangement in which the subject 401 and the subject 402 are close to each other is not detected. Similarly, the correlation between the subject 402 and the subject 403 is not detected.

As illustrated in the lower part of FIG. 4A, even when the short-time divider width is used and the number of subjects is large, the subject 411 and the subject 413 that are close to each other may often be included in different divided data. However, since the number of subjects is large (that is, the congestion degree is high), a third subject such as the subject 412 that is included in both the divided data including the subject 411 and the divided data including the subject 413 is more likely to exist. By analyzing and processing each of the divided data, the correlation between the subject 411 and the subject 412 is detected, and the correlation between the subject 412 and the subject 413 is also detected. It is therefore possible to easily restore the correlation between the subject 411 and the subject 413 that has been lost due to time division. Similarly, the correlation between the subject 413 and the subject 415 can also be restored via the subject 414. The analysis accuracy is an index indicating the degree of restoration of such a lost correlation, and is represented by a value from 0 to 1.0. The analysis accuracy is 1.0 when all the lost correlations can be restored.

Therefore, as illustrated in FIG. 3A, the analysis accuracy a of the first analysis process with the short-time divider width is higher for a larger number of subjects and is close to 1.0. In particular, when the number of subjects is small (for example, less than or equal to four), a deterioration rate of the analysis accuracy a (that is, the slope of the graph) for each number of subjects is large.

Further, as illustrated in the upper part of FIG. 4B, when the long-time divider width is used and the number of subjects is small, the subject 401 and the subject 402 that are close to each other may often be included in one divided data. Thus, the relationship between the subject 401 and the subject 402 is detected by the analysis process. The relationship between the subject 402 and the subject 403 is detected in the same manner. Moreover, as illustrated in the lower part of FIG. 4B, also when the long-time divider width is used and the number of subjects is larger, the subjects 411 to 413 and the subjects 413 to 415 that are close to each other may often be included in one divided data. Thus, the relationship between the subjects 411 to 413 and the relationship between the subjects 413 to 415 are detected by the analysis process.

In such a way, when time division is performed with the long-time divider width, even when the number of subjects is small, a deterioration amount of the analysis accuracy a is relatively small. Therefore, as can be seen from the comparison of FIG. 3A and FIG. 3B, the analysis accuracy a in the second analysis process with the long-time divider width is relatively higher than the analysis accuracy a in the first analysis process with the short-time divider width as the number of subjects decreases.

Figure 5:
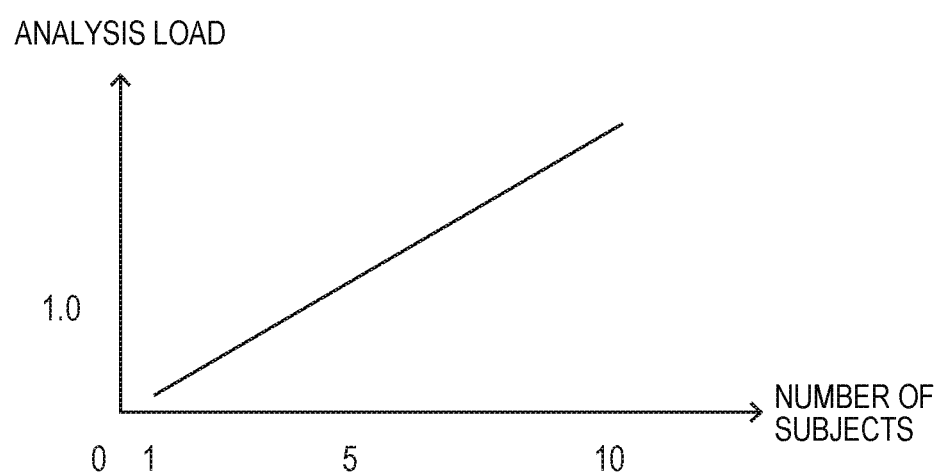
FIG. 5 is one example of a subject/load model according to the first example embodiment.

FIG. 5 is one example of a subject/load model according to the present example embodiment. The subject/load model is a modeled prediction value of the analysis load corresponding to the number of subjects and is created based on historical statistics or the like in advance. Since an analysis process for each divided data is finished in a predetermined processing period, the analysis load is represented by required central processing unit (CPU) time per unit time in the analysis cluster 110.

The graph in FIG. 5 illustrates a model defined in the following Equation (3) and the analysis load is proportional to the number of subjects. The model is used commonly when the analysis accuracy of the first analysis process and the analysis accuracy of the second analysis process are calculated.

$$\text{Analysis load} = \text{the number of subjects} * 0.25 \quad \text{Equation (3)}$$

Figure 6:
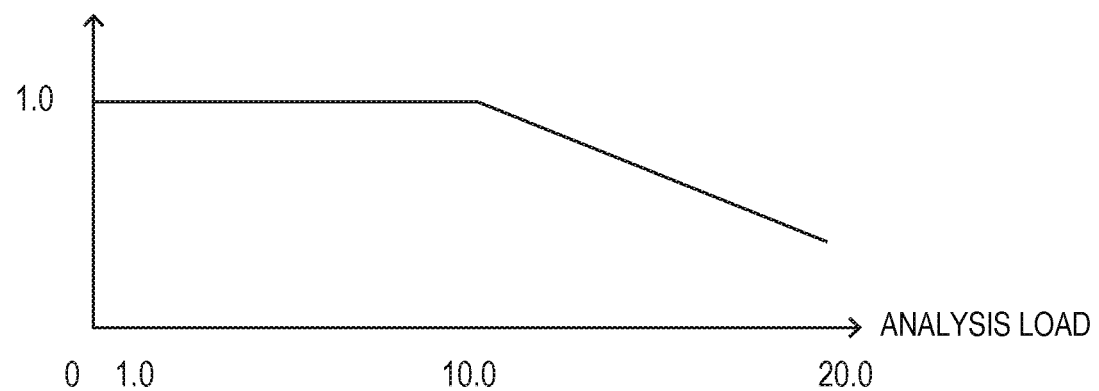
FIG. 6 is one example of a load/accuracy model according to the first example embodiment.

FIG. 6 is one example of a load/accuracy model according to the present example embodiment. The load/accuracy model is a modeled prediction value of the analysis accuracy corresponding to the analysis load for the whole analysis cluster 110 and is created based on historical statistics or the like in advance. The analysis load is represented by required CPU time per unit time as with the subject/load model.

The graph in FIG. 6 illustrates a model defined by the following Equation (4). The model is used commonly when the analysis accuracy of the first analysis process and the second analysis process is calculated.

$$\text{Analysis accuracy} = 1.0 \text{ [if analysis load} \leq 10.0\text{]},$$

$$1.0 - (\text{analysis load} - 10.0) * 0.05 \text{ [if } 10.0 < \text{analysis load} < 30.0\text{]},$$

$$0.0 \text{ [if analysis load} > 30.0\text{]} \quad \text{Equation (4)}$$

The analysis accuracy corresponding to the analysis load as illustrated in FIG. 6 is denoted as "analysis accuracy b" in particular. When the analysis load exceeds a predetermined threshold, the analysis accuracy b is lower for a larger analysis load. This is because an analysis process of divided data is interrupted before completion when a processing overflow occurs in the analysis cluster 110 due to an increase in the analysis load.

Figure 7:
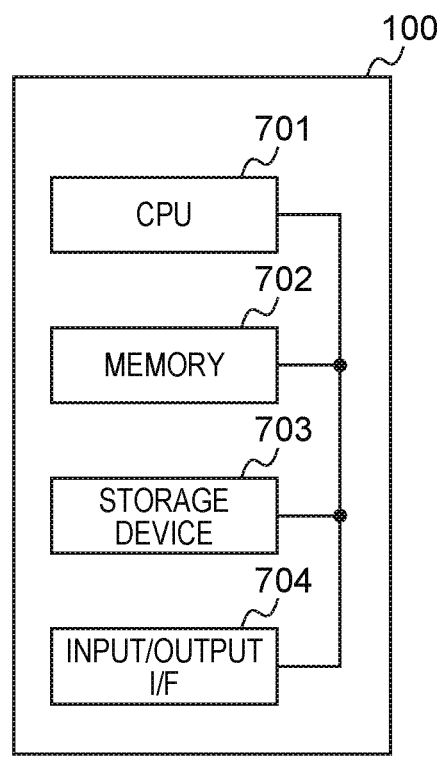
FIG. 7 is a hardware block diagram of the data division device according to the first example embodiment.

FIG. 7 is a hardware block diagram of the data division device 100 according to the present example embodiment. The data division device 100 includes a CPU 701, a memory 702, a storage device 703, and an input/output interface (I/F) 704. The CPU 701 has a function of performing a predetermined operation in accordance with a program stored in the memory 702 or the storage device 703 and controlling each component of the data division device 100. Further, the CPU 701 executes a program that implements the function of the input unit 201, the calculation unit 202, the measurement unit 203, the multiplexing unit 205, and the division unit 206.

The memory 702 is formed of a random access memory (RAM) or the like and provides a memory area required for the operation of the CPU 701. Further, the memory 702 may be used as a buffer area that implements the function of the input unit 201 and the multiplexing unit 205. The storage device 703 is a flash memory, a solid state drive (SSD), a hard disk drive (HDD), or the like, for example, and provides a storage area that implements the function of the model storage unit 204. The input/output interface 704 communicates data with external devices (the image analysis device 102 or the analysis cluster 110) based on a standard such as a Universal Serial Bus (USB), Ethernet (registered trademark), Wi-Fi (registered trademark), or the like.

Note that the hardware configuration illustrated in FIG. 7 is an example, and a device other than the above may be added, or some of the devices may not be provided. For example, some of the functions may be provided by another device via a network, or the function forming the present example embodiment may be distributed and implemented in a plurality of devices.

Figure 8:
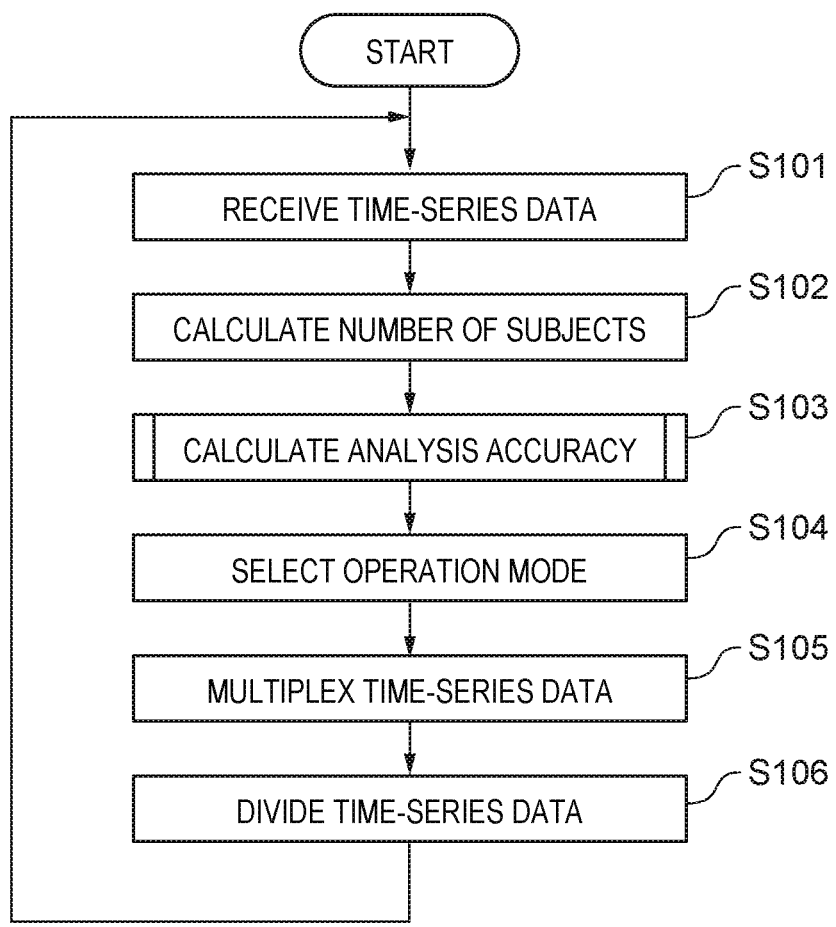
FIG. 8 is a flowchart illustrating an operation of the data division device according to the first example embodiment.

FIG. 8 is a flowchart illustrating an operation of the data division device according to the present example embodiment. First, the input unit 201 receives time-series data from the image analysis device 102 (step S101). Subsequently, the calculation unit 202 calculates the number of subjects occurring within a predetermined period from subject information included in the time-series data input to the input unit 201 (step S102).

The determination unit 207 calculates analysis accuracy obtained in the multiplex mode and the analysis accuracy obtained in the single mode, respectively, based on the number of subjects (step S103). The detail of the accuracy calculation process will be described later with reference to FIG. 9. Next, the determination unit 207 selects an operation mode by which higher analysis accuracy is obtained out of the multiplex mode and the signal mode (step S104).

When the multiplex mode is selected, the multiplexing unit 205 duplicates the time-series data received by the input unit 201 and outputs these two time-series data including the same subject information to the division unit 206 (step S105). On the other hand, when the single mode is selected, the multiplexing unit 205 directly outputs the time-series data received by the input unit 201 to the division unit 206. That is, in the single mode, no multiplexing process of the time-series data (step S105) is performed.

When the multiplex mode is selected, the division unit 206 temporally divides one of the time-series data by a short-time divider width to transmit the divided data to the analysis cluster 110 and temporally divides one of the time-series data by a long-time divider width to transmit the divided data to the analysis cluster 110 (step S106). On the other hand, when the single mode is selected, the division unit 206 temporally divides the time-series data by a short-time divider width to transmit the divided data to the analysis cluster 110. Therefore, in the single mode, only the first analysis process is performed in the analysis cluster 110, and the second analysis process is not performed (that is, the second analysis process is stopped).

Figure 9:
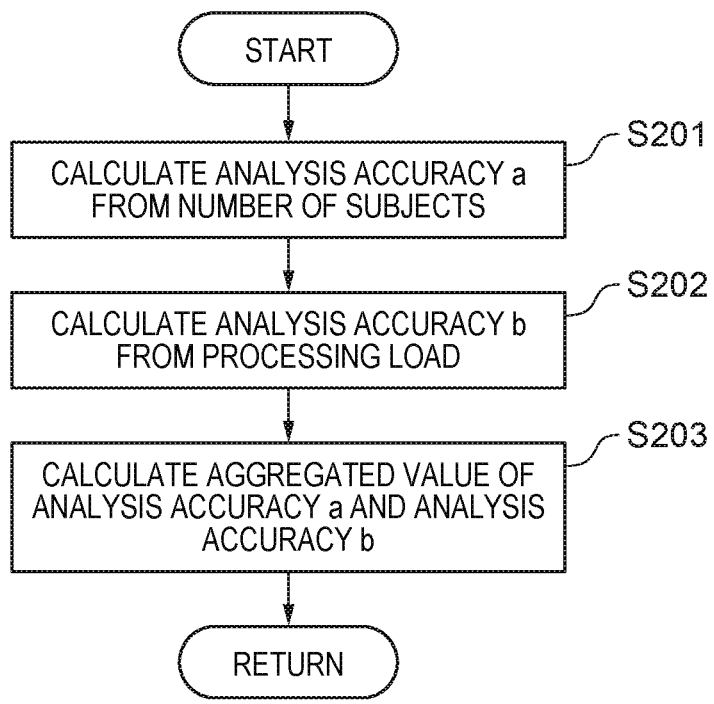
FIG. 9 is a detailed flowchart of an accuracy calculation process according to the first example embodiment.

FIG. 9 is a detailed flowchart of an accuracy calculation process according to the present example embodiment. First, the determination unit 207 uses a subject/accuracy model to calculate the analysis accuracy a obtained in the multiplex mode and the analysis accuracy a obtained in the single mode, respectively, based on the number of subjects (step S201). Two cases, namely, a case where the number of subjects is two and a case where the number of subjects is eight will be described below.

Figure 10A:
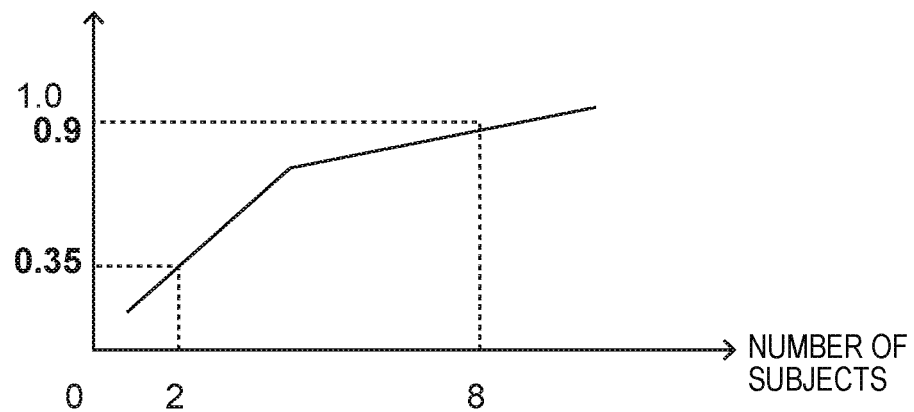
FIG. 10A is a calculation example of an analysis accuracy with the subject/accuracy model according to the first example embodiment.
Figure 10B:
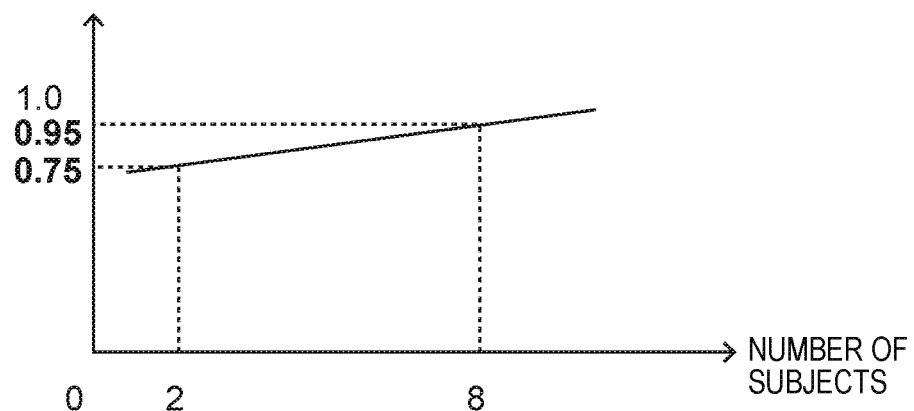
FIG. 10B is a calculation example of an analysis accuracy with the subject/accuracy model according to the first example embodiment.

As illustrated in FIG. 10A, the analysis accuracy a of the first analysis process (short-time divider width) is calculated to be 0.35 for the number of subjects "2" and 0.9 for the number of subjects "8". Further, as illustrated in FIG. 10B, the analysis accuracy a of the second analysis process (long-time divider width) is calculated to be 0.75 for the number subjects "2" and 0.95 for the number of subjects "8".

In the single mode, since only the first analysis process is performed, the analysis accuracy a obtained in the single mode is evaluated by the analysis accuracy a of the first analysis process. On the other hand, in the multiplex mode, since both of the first analysis process and the second analysis process are performed and the analysis accuracy a of the second analysis process is higher than the analysis accuracy a of the first analysis process, the analysis accuracy a obtained in the multiplex mode is evaluated by the analysis accuracy a of the second analysis process. The results of the calculation are summarized in FIG. 11.

Returning to FIG. 9, the determination unit 207 calculates the analysis accuracy b obtained in the first analysis process and the second analysis process based on the processing load of the analysis cluster 110 (step S202). In detail, the determination unit 207 uses the subject/load model to calculate the processing load for the time-series data (target data) that is a target of the division process, and obtains a processing load of data other than the target data of the analysis cluster 110 from the measurement unit 203. The determination unit 207 then sums the processing loads and uses the load/accuracy model to calculate the analysis accuracy b from the sum of processing loads.

Figure 12:
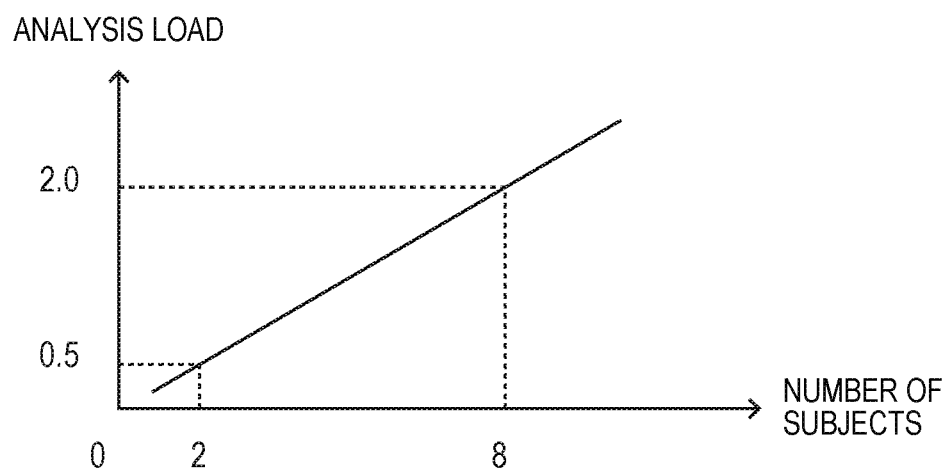
FIG. 12 is a calculation example of an analysis load with the subject/load model according to the first example embodiment.

As illustrated in FIG. 12, each analysis load of the first analysis process and the second analysis process is calculated to be 0.5 for the number of subjects "2" and 2.0 for the number of subjects "8". In the single mode, since only the first analysis process is performed, the analysis load in the single mode is equal to the analysis load of the first analysis process. On the other hand, in the multiplex mode, since both of the first analysis process and the second analysis process are performed, the analysis load in the multiplex mode is equal to the sum of the analysis load of the first analysis process and the analysis load of the second analysis process. That is, the analysis load in the multiplex mode is twice the analysis load in the single mode and is calculated to be 1.0 for the number of subjects "2" and 4.0 for the number of subjects "8".

Assuming that a processing load of data other than the target data of the analysis cluster 110 is measured as 8.0 by the measurement unit 203, the total processing load in the single mode is calculated to be 8.5 for the number of subjects "2" and 10.0 for the number of subjects "8". On the other hand, the total processing load in the multiplex mode is calculated to be 9.0 for the number of subjects "2" and 12.0 for the number of subjects "8". The results of the calculation are summarized in FIG. 14.

Figure 13A:
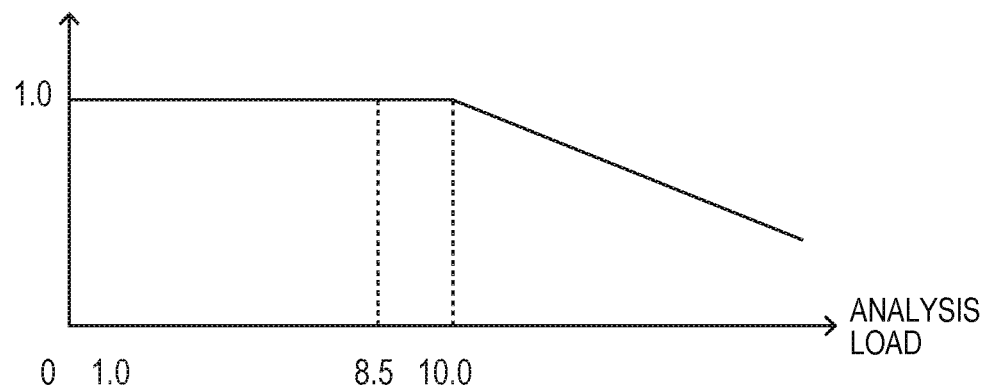
FIG. 13A is a calculation example of an analysis accuracy with the load/accuracy model according to the first example embodiment.
Figure 13B:
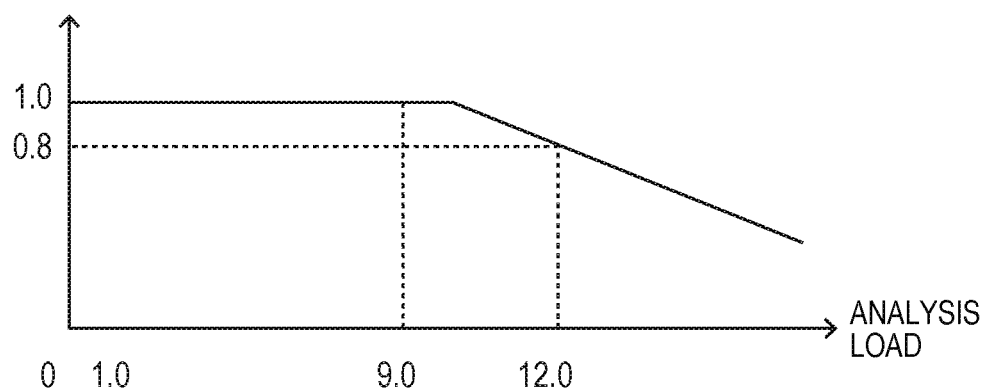
FIG. 13B is a calculation example of an analysis accuracy with the load/accuracy model according to the first example embodiment.

Thus, as illustrated in FIG. 13A, the analysis accuracy b in the single mode is calculated to be 1.0 for the number of subjects "2" and also 1.0 for the number of subjects "8". On the other hand, as illustrated in FIG. 13B, the analysis accuracy b in the multiplex mode is calculated to be 1.0 for the number of subjects "2" and 0.8 for the number of subjects "8".

Returning to FIG. 9, the determination unit 207 calculates an aggregated value of the analysis accuracy a and the analysis accuracy b (step S203). As illustrated in FIG. 15, the aggregated value is calculated by multiplying the analysis accuracy a and the analysis accuracy b. That is, the aggregated value in the single mode is calculated to be 0.35*1.0=0.35 for the number of subjects "2" and 0.90*1.0=0.90 for the number of subjects "8". On the other hand, the aggregated value in the multiplex mode is calculated to be 0.75*1.0=0.75 for the number of subjects "2" and 0.95*0.8=0.76 for the number of subjects "8".

The results of the calculation are summarized in FIG. 15. The aggregated value is the analysis accuracy obtained in each of the single mode and the multiplex mode and is the value that is finally calculated in the accuracy calculation process (step S103). Thus, in the subsequent mode select process (step S104), the multiplex mode having higher analysis accuracy (0.35<0.75) is selected when the number of subjects is two, and the single mode having higher analysis accuracy (0.90>0.76) is selected when the number of subjects is eight.

According to the present example embodiment, the first analysis process of temporally dividing time-series data by a short width to perform an analysis process and the second analysis process of temporally dividing the same time-series data by a long width to perform an analysis process are performed in parallel. It is possible to ensure a high real-time property by performing the first analysis process, and it is possible to obtain an accurate process result by performing the second analysis process. It is therefore possible to perform an accurate analysis process while maintaining a real-time property.

Further, according to the present example embodiment, since the second analysis process can be stopped, the accuracy of an analysis process can be optimized in accordance with the content of time-series data, such as the number of subjects. For example, although it is possible to improve the analysis accuracy by performing the second analysis process in addition to the first analysis process, the analysis accuracy may rather deteriorate due to an increase in the analysis load. In the present example embodiment, it is possible to balance such improvement in accuracy due to multiplexing of processes and reduction in accuracy due to an increase in load.

Second Example Embodiment

Figure 16:
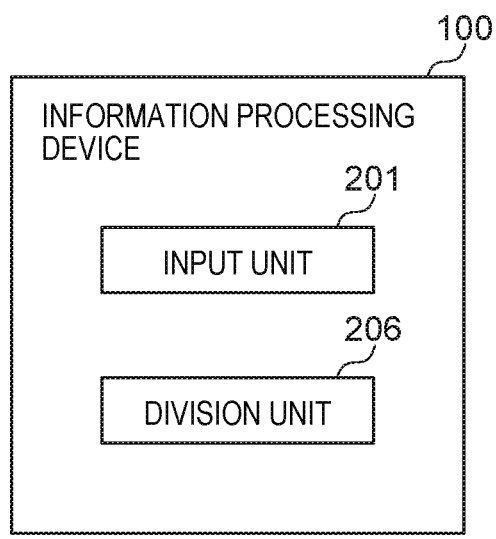
FIG. 16 is a schematic configuration diagram of an information processing device according to a second example embodiment.

FIG. 16 is a schematic configuration diagram of an information processing device according to the present example embodiment. An information processing device 100 includes an input unit 201 and a division unit 206. The input unit 201 receives time-series data including a plurality of data input in time series and having a correlation in at least a part between the data. The division unit 206 temporally divides the time-series data by a first divider width to cause the analysis cluster 110 to perform a first analysis process of the time-series data with the first divider width and temporally divides the time-series data by a second divider width that is longer than the first divider width to cause the analysis cluster 110 to perform a second analysis process of the time-series data with the second divider width.

Modified Example Embodiments

The present invention is not limited to the example embodiments described above and can be changed as appropriate within the scope not departing from the spirit of the present invention. For example, although time-series data has been described as including the subject information generated from moving image data in the example embodiments described above, the example embodiment is not limited thereto. For example, time-series data may be individual moving image data as long as the input data amount varies as the time elapses and may be audio data, data input from multiple sensors, or the like other than the above. Further, the present invention can be widely applied for an analysis target from which some correlation occurs between data, such as stock price information in the stock exchange, usage information on a credit card, traffic information, or the like without being limited to subject information.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)
An information processing device comprising:
an input unit that receives time-series data including a plurality of data input in time series and having a correlation in at least a part between the data; and
a division unit that temporally divides the time-series data by a first divider width to cause an analysis system to perform a first analysis process of the time-series data with the first divider width and temporally divides the time-series data by a second divider width that is longer than the first divider width to cause the analysis system to perform a second analysis process of the time-series data with the second divider width.

(Supplementary Note 2)
The information processing device according to supplementary note 1,
wherein the time-series data represents subject information detected from moving image data, and
the information processing device further comprising a determination unit that selects either a multiplex mode to perform the first analysis process and the second analysis process or a single mode to stop the second analysis process based on the number of subjects within a predetermined period included in the time-series data.

(Supplementary Note 3)
The information processing device according to supplementary note 2, wherein the determination unit calculates analysis accuracy representing a degree of restoration of the correlation lost by time division based on the number of subjects and selects a mode by which higher analysis accuracy is obtained out of the multiplex mode and the single mode.

(Supplementary Note 4)
The information processing device according to supplementary note 3, wherein the determination unit calculates the analysis accuracy to be higher as the number of subjects increases.

(Supplementary Note 5)
The information processing device according to supplementary note 3 or 4, wherein the determination unit sets the analysis accuracy of the second analysis process to be higher than the analysis accuracy of the first analysis process.

(Supplementary Note 6)
The information processing device according to supplementary note 4 or 5, wherein the determination unit sets the analysis accuracy of the second analysis process to be relatively higher than the analysis accuracy of the first analysis process as the number of subjects decreases.

(Supplementary Note 7)
The information processing device according to any one of supplementary notes 3 to 6, wherein the determination unit calculates the analysis accuracy obtained in the multiplex mode and the analysis accuracy obtained in the single mode, respectively, based on a processing load of the analysis system.

(Supplementary Note 8)
The information processing device according to supplementary note 7, wherein when the processing load exceeds a predetermined threshold, the determination unit causes the analysis accuracy obtained in the multiplex mode to be lower than the analysis accuracy obtained in the single mode as the processing load increases.

(Supplementary Note 9)
An information processing method comprising:
receiving time-series data including a plurality of data input in time series and having a correlation in at least a part between the data; and
temporally dividing the time-series data by a first divider width to cause an analysis system to perform a first analysis process of the time-series data with the first divider width and temporally dividing the time-series data by a second divider width that is longer than the first divider width to cause the analysis system to perform a second analysis process of the time-series data with the second divider width.

(Supplementary Note 10)
A storage medium storing a program that causes a computer to perform:

receiving time-series data including a plurality of data input in time series and having a correlation in at least a part between the data; and temporally dividing the time-series data by a first divider width to cause an analysis system to perform a first analysis process of the time-series data with the first divider width and temporally dividing the time-series data by a second divider width that is longer than the first divider width to cause the analysis system to perform a second analysis process of the time-series data with the second divider width.

REFERENCE SIGNS LIST 10 surveillance system
11 monitoring section
100 data division device (information processing device)
101 surveillance camera
102 image analysis device
103 distributed processing device
104 display device
105 database
110 analysis cluster (analysis system)
201 input unit
202 calculation unit
203 measurement unit
204 model storage unit
205 multiplexing unit
206 division unit
207 determination unit
401 to 403, 411 to 415 subject
701 CPU
702 memory
703 storage device
704 input/output I/F

The invention claimed is:

1. An information processing device comprising:
one or more non transitory storage devices configured to store instructions; and
one or more processors configured by the instructions to:
receive time-series data and having at least a partial correlation between the data, the time series data represents subject information detected from moving image data;
temporally divide the time-series data by a first divider width to cause an analysis system to perform a first analysis process of the time-series data with the first divider width and temporally divides the time-series data by a second divider width that is longer than the first divider width to cause the analysis system to perform a second analysis process of the time-series data with the second divider width; and
select either a multiplex mode to perform the first analysis process and the second analysis process or a single mode to stop the second analysis process based on the number of subjects within a predetermined period included in the time-series data.

2. The information processing device according to claim 1, wherein the one or more processors are further configured by the instructions to calculate analysis accuracy representing a degree of restoration of the correlation lost by time division based on the number of subjects and select a mode by which higher analysis accuracy is obtained out of the multiplex mode and the single mode.

3. The information processing device according to claim 2, wherein the one or more processors are further configured by the instructions to calculate the analysis accuracy to be higher as the number of subjects increases.

4. The information processing device according to claim 2, wherein the one or more processors are further configured by the instructions to set the analysis accuracy of the second analysis process to be higher than the analysis accuracy of the first analysis process.

5. The information processing device according to claim 3, wherein the one or more processors are further configured by the instructions to set the analysis accuracy of the second analysis process to be relatively higher than the analysis accuracy of the first analysis process as the number of subjects decreases.

6. The information processing device according to claim 2, wherein the one or more processors are further configured by the instructions to calculate the analysis accuracy obtained in the multiplex mode and the analysis accuracy obtained in the single mode, respectively, based on a processing load of the analysis system.

7. The information processing device according to claim 6, wherein when the processing load exceeds a predetermined threshold, the one or more processors are further configured by the instructions to cause the analysis accuracy obtained in the multiplex mode to be lower than the analysis accuracy obtained in the single mode as the processing load increases.

8. An information processing method comprising:
receiving time-series data and having at least a partial correlation between the data, the time series data represents subject information detected from moving image data; and
temporally dividing the time-series data by a first divider width to cause an analysis system to perform a first analysis process of the time-series data with the first divider width and temporally dividing the time-series data by a second divider width that is longer than the first divider width to cause the analysis system to perform a second analysis process of the time-series data with the second divider width; and
selecting either a multiplex mode to perform the first analysis process and the second analysis process or a single mode to stop the second analysis process based on the number of subjects within a predetermined period included in the time-series data.

9. A non-transitory storage medium storing a program that causes a computer to perform:
receiving time-series data and having at least a partial correlation between the data, the time series data represents subject information detected from moving image data; and
temporally dividing the time-series data by a first divider width to cause an analysis system to perform a first analysis process of the time-series data with the first divider width and temporally dividing the time-series data by a second divider width that is longer than the first divider width to cause the analysis system to perform a second analysis process of the time-series data with the second divider width; and
selecting either a multiplex mode to perform the first analysis process and the second analysis process or a single mode to stop the second analysis process based on the number of subjects within a predetermined period included in the time-series data.

* * * * *